US009410730B1

(12) United States Patent  
Keefe

(10) Patent No.: US 9,410,730 B1  
(45) Date of Patent: Aug. 9, 2016

(54) FREEZER THAW INDICATOR

(71) Applicant: Peter David Keefe, Roseville, MI (US)

(72) Inventor: Peter David Keefe, Roseville, MI (US)

(*) Notice: Subject to any disclaimer, the term of this patent is extended or adjusted under 35 U.S.C. 154(b) by 0 days.

(21) Appl. No.: 14/932,064

(22) Filed: Nov. 4, 2015

(51) Int. Cl.  
*F25D 21/02* (2006.01)

(52) U.S. Cl.  
CPC .................... *F25D 21/02* (2013.01)

(58) Field of Classification Search  
CPC ... F25D 21/02; F25D 2700/122; G01K 11/06; A23L 1/00  
USPC .......................................................... 426/88  
See application file for complete search history.

(56) References Cited

U.S. PATENT DOCUMENTS

| | | | | | |
|---|---|---|---|---|---|
| 3,063,235 | A | * | 11/1962 | Winchell | G01K 3/04 368/1 |
| 3,220,259 | A | * | 11/1965 | Beyer | G01K 3/04 116/217 |
| 3,414,415 | A | * | 12/1968 | Broad, Jr. | G01K 3/04 116/219 |
| 3,618,558 | A | * | 11/1971 | Tepfer | G01K 11/08 116/216 |
| 3,620,677 | A | * | 11/1971 | Morison | B01D 15/08 116/200 |
| 4,114,443 | A | * | 9/1978 | Clark | G01K 11/06 116/217 |
| 4,137,049 | A | * | 1/1979 | Couch | G01K 3/02 116/206 |
| 6,357,383 | B1 | * | 3/2002 | Al harshani | G01K 11/06 116/216 |
| 2008/0026110 | A1 | * | 1/2008 | Cooper | G01K 11/06 426/88 |
| 2011/0108551 | A1 | * | 5/2011 | Lee | B65D 45/325 220/212 |

OTHER PUBLICATIONS

RoadPro Freezer Alert Alarm Model RP2135 Fact Sheet of RoadPro, Palmyra, PA 17078. Copyright 2015.  
Chaney Wireless Freezer Thermometer Instructions Sheet of Chaney Instrument Company, Lake Geneva, WI 53147. Date unknown.  
VWR Freezer Thermometer Fact Sheet of VWR International, Radnor, PA 19087. Date unknown.  
General Electric Refrigerator Diagnostic System Error, Fault and Function Codes Information Sheet of General Electric Company of Schenectady, NY, including Check frozen food, Code FF, and Power to refrigerator has been out, Code PF. Date believed Aug. 14, 2015.  
Biosynergy StaFreez Irreversible Liquid Crystal Freeze-Thaw Indicator, Product Bulletin of Biosynergy, Inc., Elk Grove Village, IL 60007, dated 2014.  
Biosynergy StaFreez Irreversible Liquid Crystal Freeze-Thaw Indicator, Fact Sheet of Biosynergy, Inc., Elk Grove Village, IL 60007, believed dated 2014.  
Biosynergy StaFreez Irreversible Liquid Crystal Freeze-Thaw Indicator, Time/Temperature Solutions Fact Sheet of Biosynergy, Inc., Elk Grove Village, IL 60007, believed dated 2014.

* cited by examiner

Primary Examiner — Emmanuel Duke

(57) ABSTRACT

A container has a porous support member affixed thereinside defining upper and lower chambers and a liquid partly filling the container. The liquid is frozen in the upper chamber. The container is oriented so that the upper chamber is gravitationally above the lower chamber, wherein the frozen liquid remains in the upper chamber. The container is placed in a cold zone of a freezer. Thereafter, the presence of the liquid in the lower chamber is indicative that a thaw episode has occurred. The presence of the liquid frozen in the lower chamber is indicative that the thaw episode has been followed by a refreeze event.

3 Claims, 8 Drawing Sheets

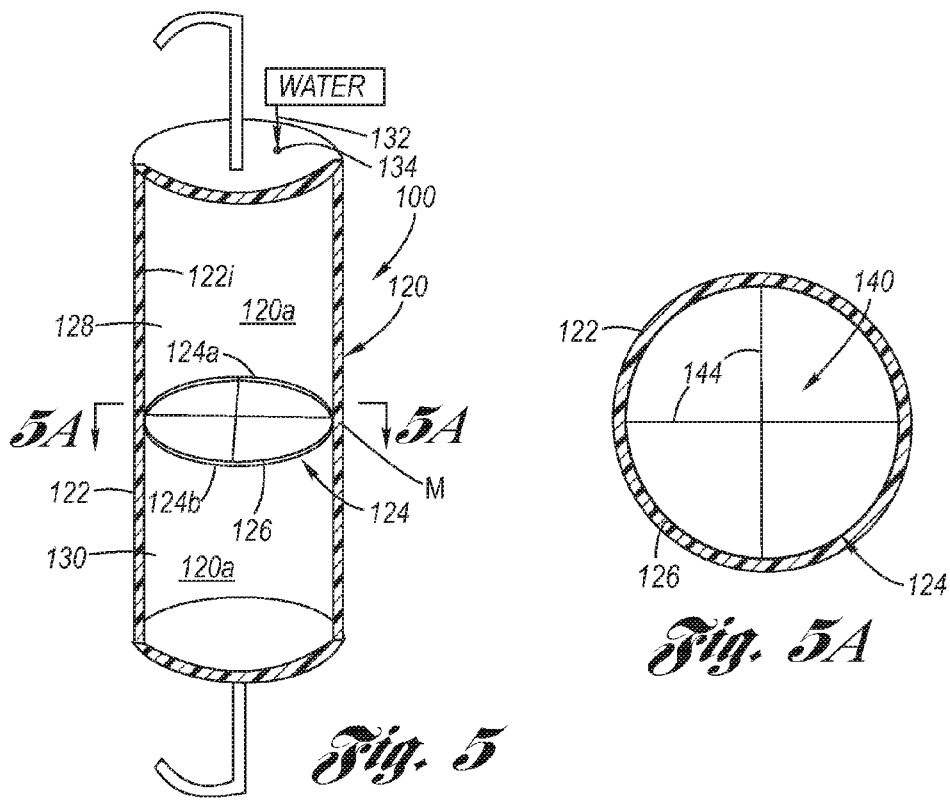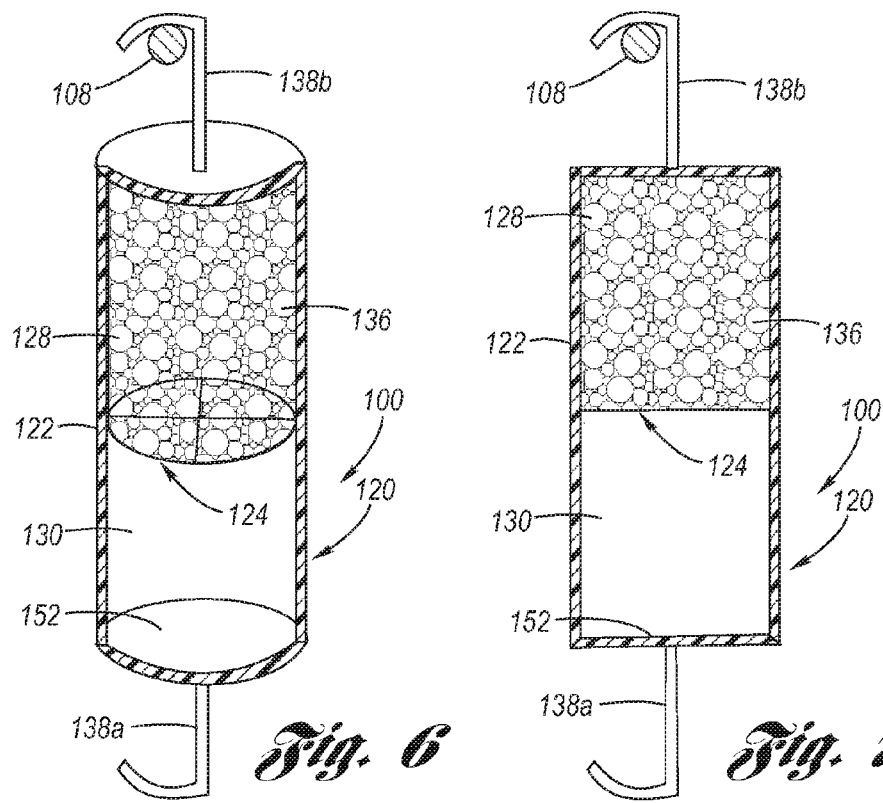

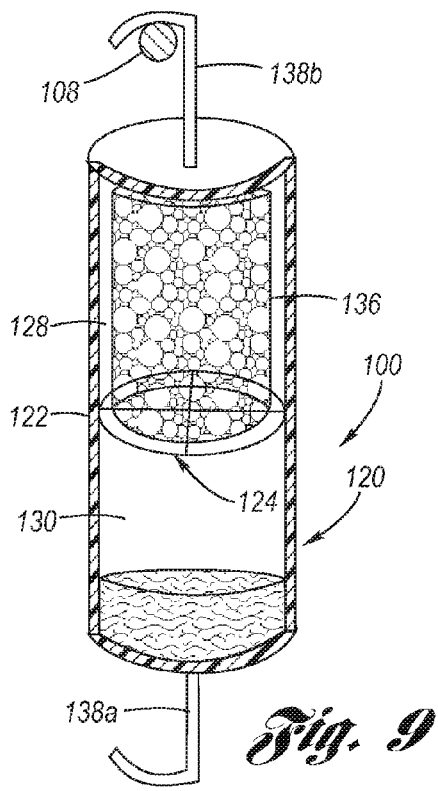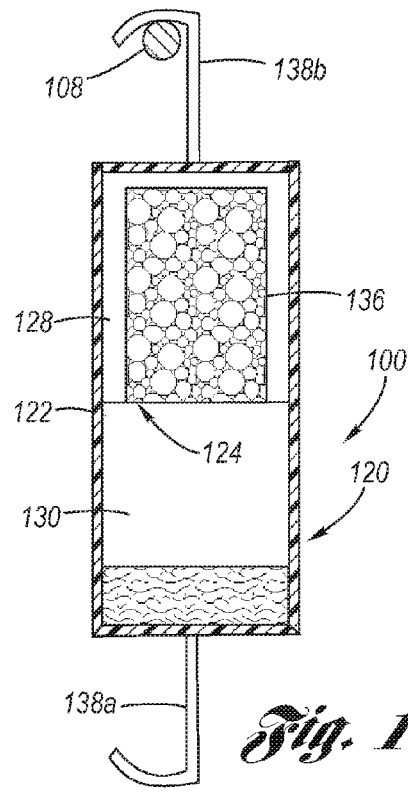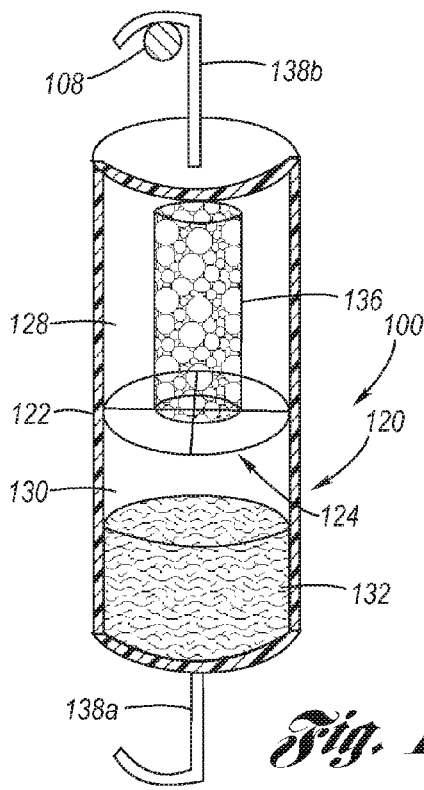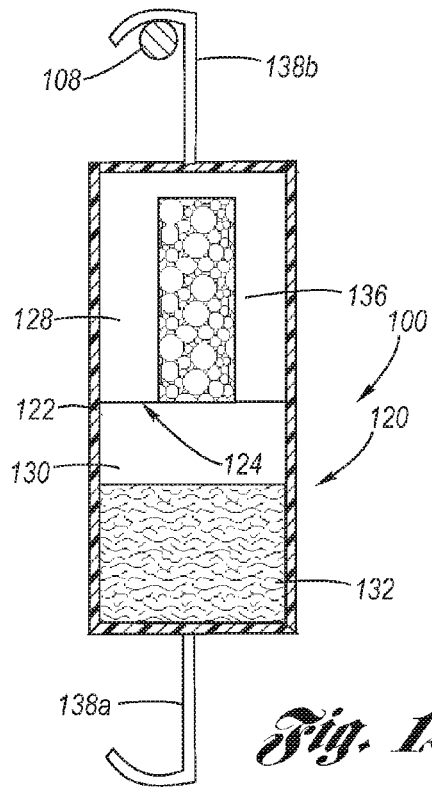

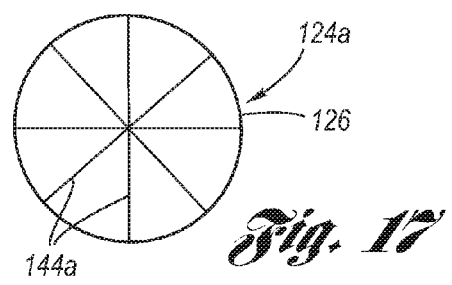
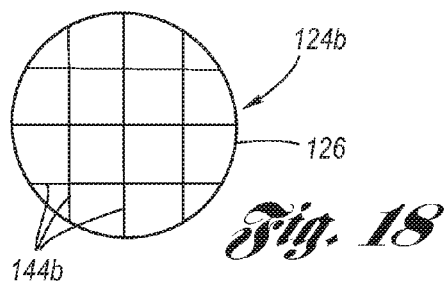
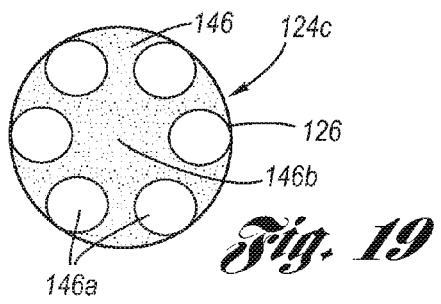
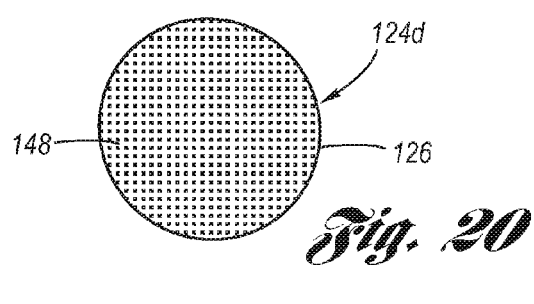
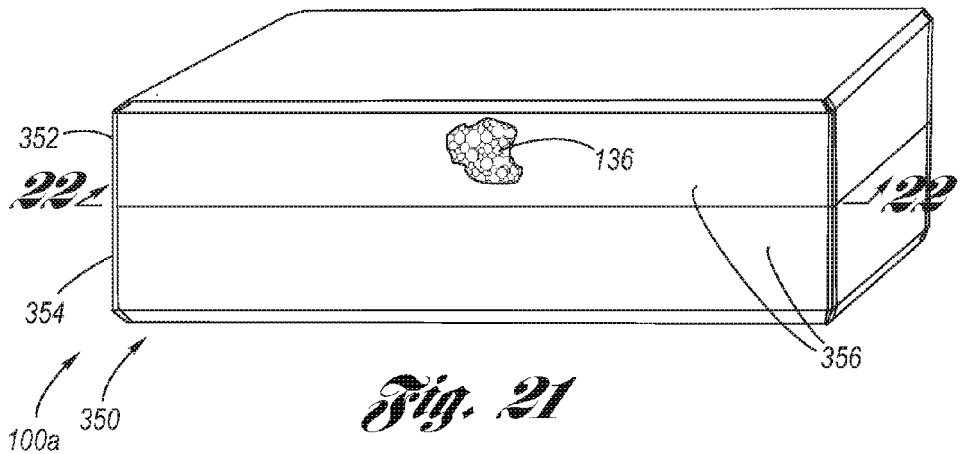
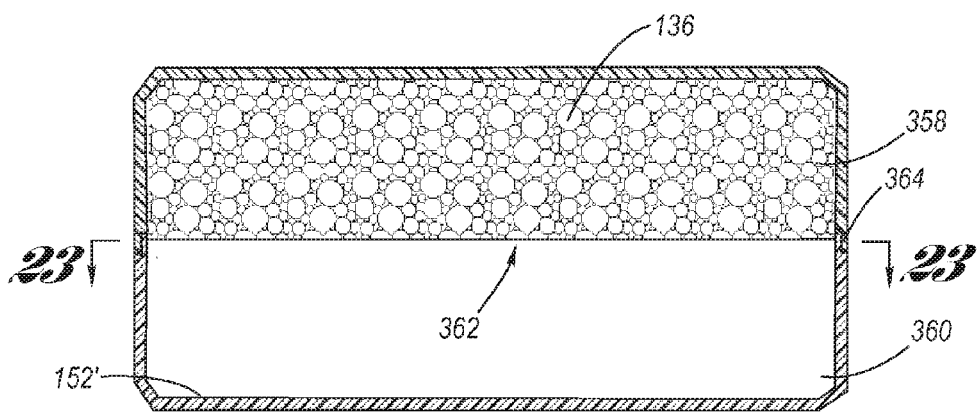

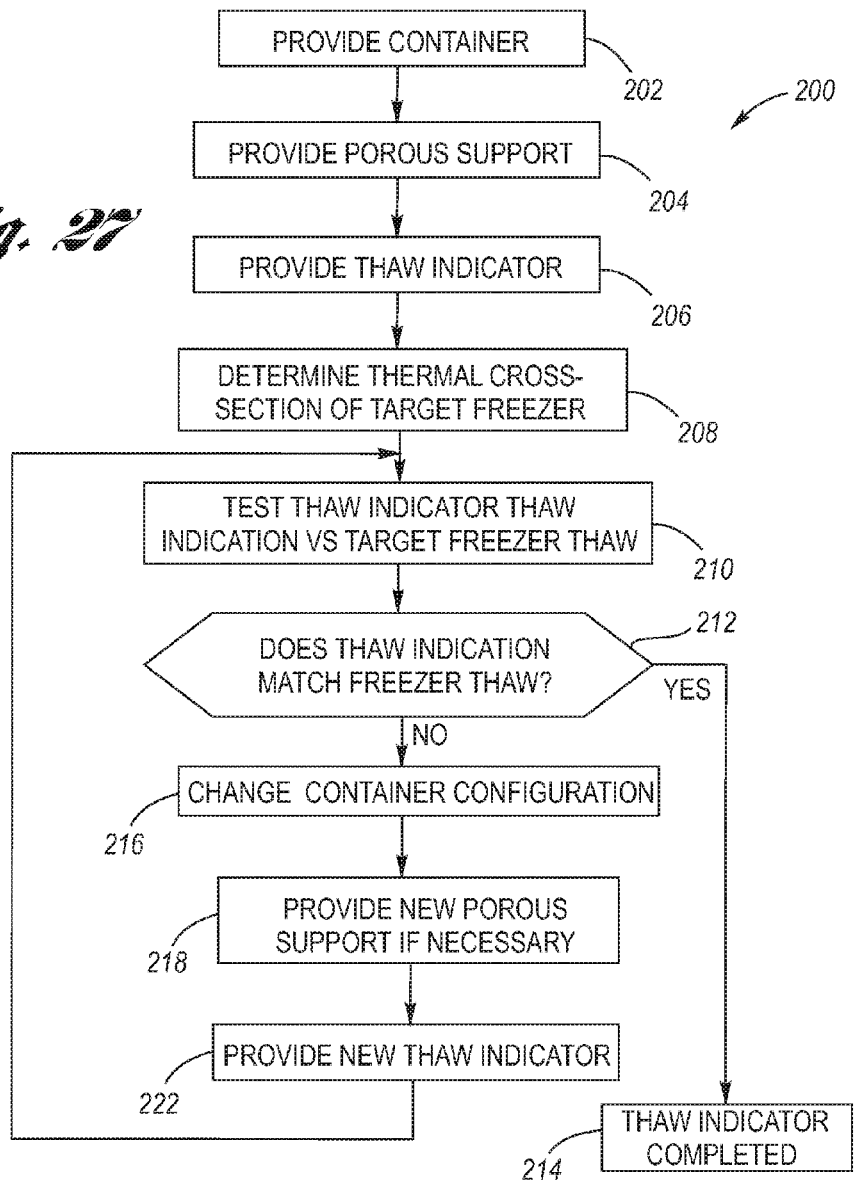

FREEZER THAW INDICATOR

TECHNICAL FIELD

The present invention relates generally to refrigerated freezers which provide a cold zone of temperature below the freezing point of water at standard pressure.

More particularly, the present invention relates to an indicator device for indicating a thaw episode, wherein temperature above the freezing point of water has occurred in the cold zone.

Still more particularly, the present invention relates to an indicator device for indicating the thaw episode has been followed by a refreeze event.

BACKGROUND OF THE INVENTION

Refrigerated freezers (hereafter, simply freezers) are ubiquitous in household, commercial and industrial applications. Freezers provide a cold zone of temperature below the freezing point of water at standard pressure irrespective of the ambient temperature outside the freezer. Refrigeration is provided by a refrigeration apparatus, most commonly electrically powered, but other sources of power may be utilized, such as natural gas.

In the event the source of power is lost (a power outage), as for example the result of an interruption of service from a public utility, or even something so local as a child accidentally kicking out a power cord from its socket, the refrigeration apparatus of the freezer stops providing cooling of the cold zone. Heat from the ambient external environment is omnipresent and, assuming this is above the temperature of the cold zone, unremittingly transfers heat into the cold zone through the freezer walls (inclusive of door, seals, etc.). Without a regular extraction of heat by the refrigeration apparatus, heat transfer from the external environment will warm the cold zone, increasing the temperature thereof until the temperature of the cold zone and that of the external environment are equalized.

The rate at which the cold zone will warm depends upon the difference in temperature between the cold zone and the external environment, the thermal conductivity of the freezer walls (inclusive of the door, seals, etc.), the specific heat of the materials of the freezer and the specific and latent heats of objects within the cold zone. The latent heat of the objects depends upon the mass of the objects and the inherent heat of fusion thereof. The combination of these physical properties shall be hereinbelow referred to as a "freezer thermal cross-section".

A freezer cold zone that is empty (filled with air) will warm much faster than one filled with objects. An example in everyday life of how latent heat retards heating is the duration for which an ice cube remains floating on a glass of tea in the summertime. Concomitant in this example, as long as the ice cube remains, the tea will stay cooler than the external environment of the glass.

While a power outage may be brief and the latent heat of the objects in the freezer able to absorb incoming heat so as to maintain substantially the below water freezing temperature of the cold zone of the freezer, an extended duration of power outage will eventually render a thaw of the objects in the freezer.

In the above nonlimiting scenarios, the power company will eventually restore power or a child may notice days later the plug had been kicked out of its socket and nonchalantly plug it back in. With power restored, the refrigeration apparatus of the freezer will re-establish the below water freezing temperature of the cold zone. A user of the freezer would likely be unable to know whether objects in the freezer stayed frozen or thawed and refroze. This is a worry for those who store frozen foods in a cold zone of a freezer and do not wish those foods to thaw and then refreeze.

Accordingly, what is needed in the art is a thaw indicator for indicating a thaw episode of a cold zone of a freezer has occurred, and further, indicating whether the thaw episode has been followed by a refreeze event.

SUMMARY OF THE INVENTION

The present invention is a freezer thaw indicator, or "Thawometer", for indicating a thaw episode of a cold zone of a freezer, and further indicating whether or not the thaw episode has been followed by a refreeze event.

The freezer thaw indicator according to the present invention is composed of a container providing a closed inner space composed of an upper chamber and a lower chamber. Between and demarcating the upper and lower chambers is a porous support member. Water, or another selected liquid, hereinafter simply 'water', partly fills the closed inner space of the container, preferably filling the upper chamber. At least a portion of the lower chamber is preferably transparent, most preferably clear. It is also preferred for the inside surface of the container walls to be hydrophobic (e.g., non-stick) so that the water does not wet the surface.

In operation, a user places the freezer thaw indicator into a cold zone of a freezer in an inverted attitude; that is, the upper chamber is vertically below the lower chamber with respect to gravity. After a period of time, the water freezes in the upper chamber.

The user then attitudinally rights the freezer thaw indicator so that the upper chamber is vertically above the lower chamber with respect to gravity, whereupon the ice remains in the upper chamber. No ice or water is present at the floor of the lower chamber, neglecting surface wetting as described in further detail hereinbelow.

In the event of occurrence of a thaw episode within the cold zone of the freezer, the ice in the upper chamber will melt, passing through the porous support member and collecting in the lower chamber. The severity of the thaw episode is recorded by the depth of water accumulation in the lower chamber.

In the event the refrigeration apparatus of the freezer re-establishes a frozen condition in the cold zone of the freezer, the water in the lower chamber will freeze into ice. The presence of ice in the lower chamber is indicative that the thaw episode, the severity of which being indicated by the depth of the ice, was followed by a refreeze event in the cold zone.

Accordingly, it is an object of the present invention to provide a freezer thaw indicator for indicating occurrence of a thaw episode within the cold zone of a freezer.

It is a further object of the present invention to provide a freezer thaw indicator for indicating that a refreeze event of the cold zone of a freezer has transpired following the thaw episode.

It is yet another object of the present invention to provide a freezer thaw indicator of a simple, yet dependable mechanical construction that is not reliant on electronics.

This and additional objects, features and advantages of the present invention will become clearer from the following specification of a preferred embodiment.

BRIEF DESCRIPTION OF THE DRAWINGS

FIG. 5 is a three dimensional cross-sectional view of the closed container and porous support member of the freezer thaw indicator of FIGS. 1 through 4, wherein the water has been removed for clarity.

FIG. 5A is a cross-sectional view, seen along line 5A-5A of FIG. 5.

FIG. 6 is a three dimensional cross-sectional view, seen along line 6-6 of FIG. 2.

FIG. 7 is a two dimensional cross-sectional view, seen along line 6-6 of FIG. 2.

FIGS. 9, 11, 13 and 15 are three dimensional cross-sectional views as in FIG. 7, now showing progressive severity of thaw within the cold zone of the freezer of FIGS. 1 and 3.

FIGS. 10, 12, 14 and 16 are two dimensional cross-sectional views as in FIG. 8, now showing progressive severity of thaw within the cold zone of the freezer of FIGS. 1 and 3.

FIGS. 17 through 20 are cross-sectional views as in FIG. 5A, showing various structures of the porous support member.

FIG. 21 depicts a squat cuboid configuration of the freezer thaw indicator according to the present invention, shown ready to indicate thaw.

FIG. 22 is a sectional view, seen along line 22-22 of FIG. 21.

FIG. 27 is an algorithm for selectively adjusting the thaw sensitivity of the freezer thaw indicator according to the present invention with respect to a predetermined thermal cross-section of a freezer.

FIG. 28 is a three dimensional cross-sectional view of a freezer thaw indicator according to the present invention described in Examples IV and VI.

FIG. 29 is a two dimensional cross-sectional view of a freezer thaw indicator according to the present invention described in Example V.

DESCRIPTION OF THE PREFERRED EMBODIMENT

Figure 1:
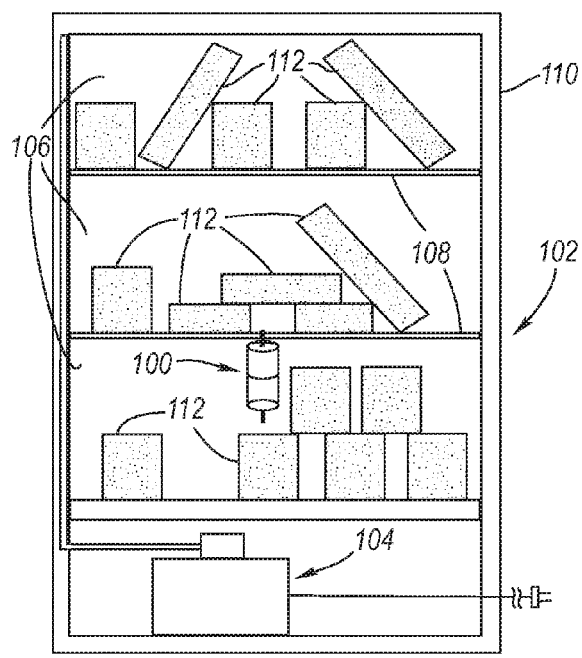
FIG. 1 is a schematic diagram of a freezer in which the door and lower trim have been removed for clarity of the view, the view showing a refrigeration apparatus, a cold zone having therein objects, and insulated walls. The freezer thaw indicator according to the present invention is shown ready to indicate thaw.
Figure 2:
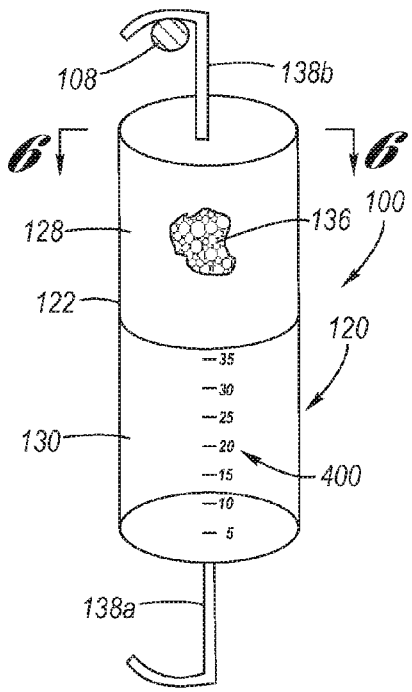
FIG. 2 is an enlarged view of the freezer thaw indicator of FIG. 1.

Referring now to the Drawings, FIGS. 1 through 4 depict aspects for implementing a freezer thaw indicator 100 according to the present invention. Throughout the views and description below, water is referenced; however, another selected liquid can be substituted for water.

The freezer thaw indicator 100 can be implemented with any freezer 102, irrespective of its mode of refrigeration. Merely by way of example, the freezer 102 utilizes an electrically operated refrigeration apparatus 104, but natural gas refrigeration or other modalities of refrigeration may be utilized by the freezer to provide a cold zone 106 thereinside.

The cold zone 106 is a region within the freezer 102 which provides a volume at a selected cold temperature, $T_c$, below the freezing temperature of water at ambient atmospheric pressure. For example, at sea level, the freezing temperature of water is 32 degrees Fahrenheit (zero degrees Celsius). A cold zone 106 for the preservation of frozen food, by way of example, may have a cold temperature, $T_c$, of between zero and 10 degrees Fahrenheit. The cold zone 106 is shielded from the heat of the (typically) warmer external environment by insulated walls 110, wherein the term "walls" includes the door, seals, etc. Of course, in applications where the freezer is subjected to external cold, such as an application in which the freezer is disposed in an unheated garage in winter of a northern state, the temperature of the external environment can fall below the cold zone temperature, in which case the refrigeration apparatus is idle.

The cold zone 106 may have compartments and/or shelving 108 for the placement of objects 112 therein. The objects 112 may be foods, medications, chemicals, etc. The objects 112 may be pre-frozen or freeze after placement into the cold zone 106.

Figure 3:
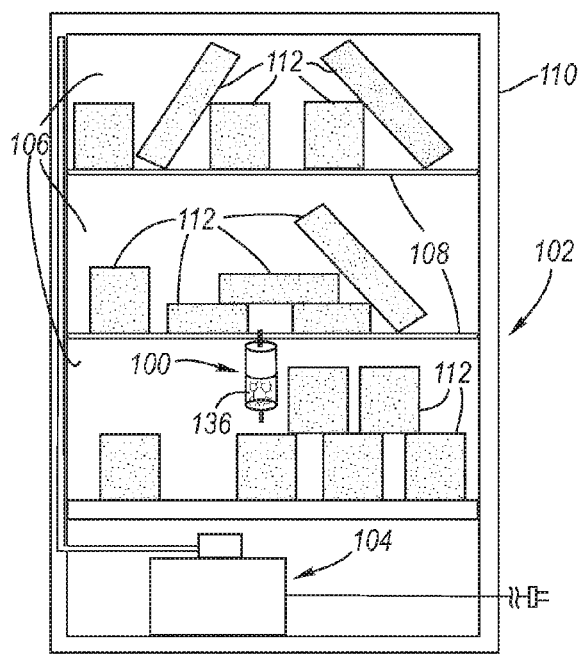
FIG. 3 is a schematic diagram as in FIG. 1, wherein now the freezer thaw indicator indicates a thaw episode has occurred in the cold zone of the freezer, and further, that a refreeze event has thereafter transpired.

As depicted at FIGS. 1 and 3, the freezer thaw indicator 100 dependingly hangs from a shelf 108 of the freezer 102. As will be discussed hereinbelow, this mode of operation is not required, as the freezer thaw indicator according to the present invention may simply rest upon any surface in the cold zone 106 (see Examples I through VI).

Turning attention now additionally to FIGS. 5 and 5A, the freezer thaw indicator 100 is composed of a container 120.

The container walls 122 may be, for nonlimiting example, composed of plastic, glass, or another material suitable for the purpose of the present invention. The container 120 is closed in the sense that a liquid thereinside cannot leak out.

A porous support member 124 is disposed cross-sectionally at a predetermined location within the container walls 122, preferably at the mid-point M thereof. By way of example, the porous support member 124 is glued, heat or sonic welded, over-molded, snap-fit, anchored or otherwise fixed in relation to the container walls 122. For example as shown at FIG. 5A, a ring 126 supporting filaments 144 may attach to the inside surface 122i of the container walls 122. The selected location of the porous support member 124 provides a demarcation at which the interior space 120a of the container 120 is divided into an upper chamber 128 on one side 124a of the porous support member and a lower chamber 130 on the other side 124b of the porous support member.

It should be noted that the presence of a ring could cause melt water retention between the ice and the container wall during the initial stage of a thaw event. If the thaw event abruptly ceases and the melt refreezes, there could be no indication of thaw in the lower chamber. To prevent this, the ring should be very thin (i.e., the diameter of a filament), as shown at FIG. 5A, set into a recess of the container walls, or otherwise configured to prevent any ice melt retention.

Figure 26:
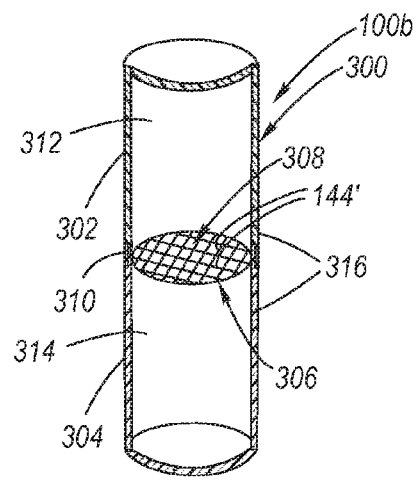
FIG. 26 is a cross-sectional view of a freezer thaw indicator similar to FIG. 5, wherein now the porous support member is a window screen and the upper and lower hooks are absent.

Water 132 is placed into the closed inner space 120a, preferably filling the upper chamber 128. For example as shown at FIG. 5, water is injected into the container through an opening 134, after which the opening is sealed. Other examples of water filling techniques include removing a cap at one end of the container, filling the water, then replacing the cap as shown at FIGS. 28 and 29 (preferably a one time removable cap modality), or having the container assemble from two or more component parts, wherein water is filled prior to assembly of the parts as shown at FIGS. 22 and 26. Other water filling techniques may be used.

Preferably, the container has equal volumes of the upper and lower chambers 128, 130, although this is not requisite. The lower chamber 130 is preferably transparent, most preferably transparently clear, which may be for example realized by a vertically transparent sight provided in the wall 122 for observing the liquid level in the lower chamber. The upper chamber 128 may be likewise transparent, or may be otherwise, as for example opaque.

The water 132 is preferred to be visually altered by addition of a visual marker. The visual marker may be for example coloration, as for example by the addition of dye, ink or food/water coloring, or may be for example luminescence, as for example by the addition of a luminescent pigment or dye, wherein the visual marker makes notable to an onlooker the presence of water in the lower chamber 130. It is also preferred for the inside surface 122i of the container walls 122 to be hydrophobic (e.g., non-stick) so that the water does not wet the surface.

Referring now additionally to FIGS. 6 through 16, operation of the freezer thaw indicator 100 will be detailed.

As shown at FIGS. 8A through 8D, a user places the freezer thaw indicator 100 into the cold zone 106 of a freezer 102 in an inverted attitude, that is, the upper chamber 128 is vertically below the lower chamber 130 with respect to gravity. This may be accomplished, for example, by a first hook 138a hooked onto a shelf 108. In this orientation, the water 132 is present in the upper chamber 128, by way of example shown at FIG. 8B. After a period of time, the water 132 freezes into ice 136 in the upper chamber 128, by way of example shown at FIG. 8D.

As shown at FIGS. 1, 2, 6 and 7, the user then attitudinally rights the freezer thaw indicator 100, whereupon the upper chamber 128 is vertically above the lower chamber 130 with respect to gravity. For example, this may be accomplished by a second hook 138b hooked onto the shelf 108. The ice 136 in the upper chamber 128 is held in place by surface interaction with the inside surface 122i and/or by resting upon the porous support member 124 and no ice or water is present at the floor 152 of the lower chamber 130, ignoring any water present due to surface wetting.

As progressively depicted in FIGS. 9 through 16, in the event of occurrence of a thaw episode within the cold zone of the freezer, the ice 136 in the upper chamber 128 will melt, whereupon water 132 of the melt will pass through the porous support member 124 and collect in the lower chamber 130. The severity of the thaw episode is recorded by the depth of water 132 accumulated in the lower chamber 130. During melting, ice 136 in the upper chamber 128 will be supported by the porous support member 124.

Figure 4:
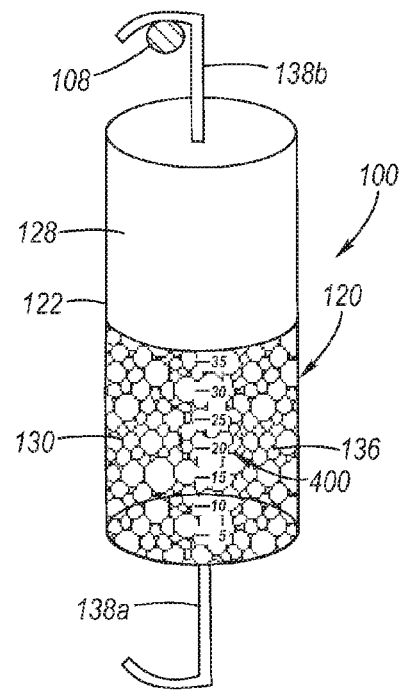
FIG. 4 is an enlarged view of the freezer thaw indicator of FIG. 3.
Figure 8A:
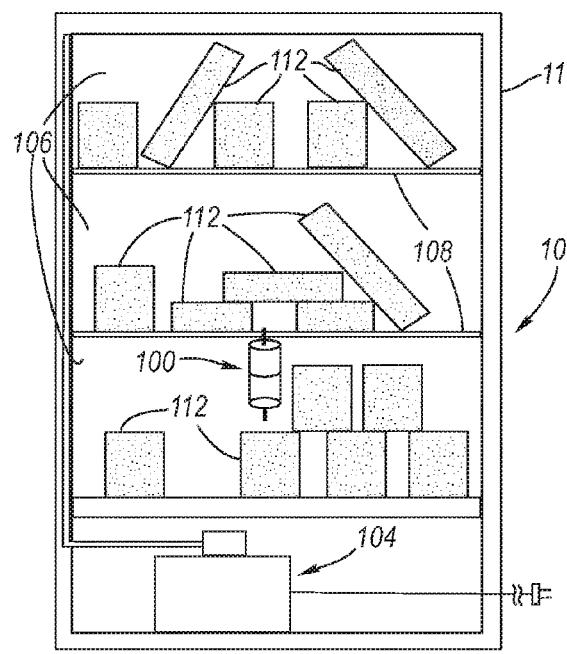
FIGS. 8A and 8B show a first set-up step of installation of the freezer thaw indicator according to the present invention.
Figure 8B:
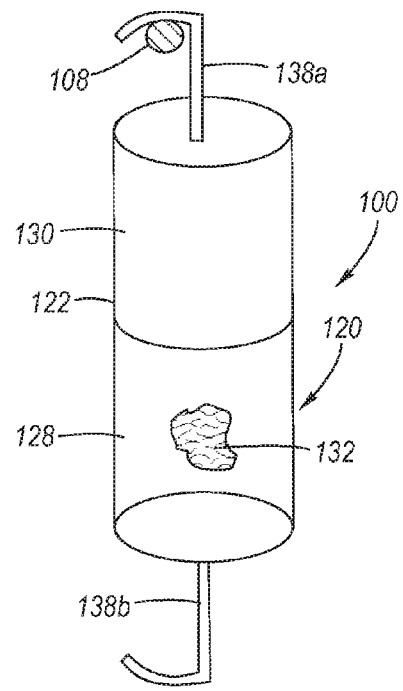
Figure 8C:
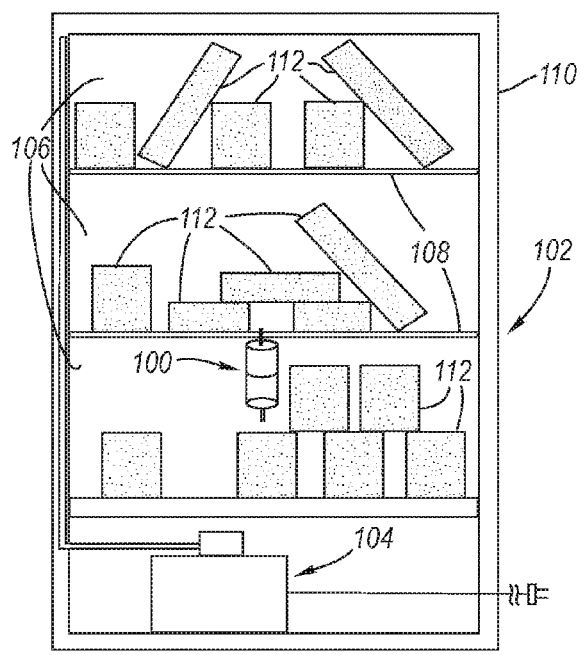
FIGS. 8C and 8D show a second set-up step of installation of the freezer thaw indicator according to the present invention.
Figure 8D:
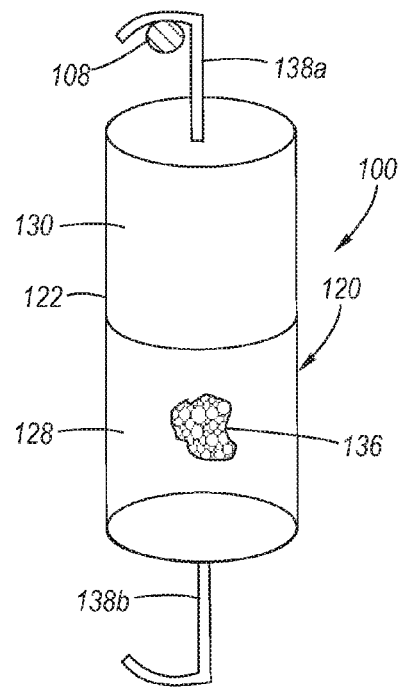
Figure 13:
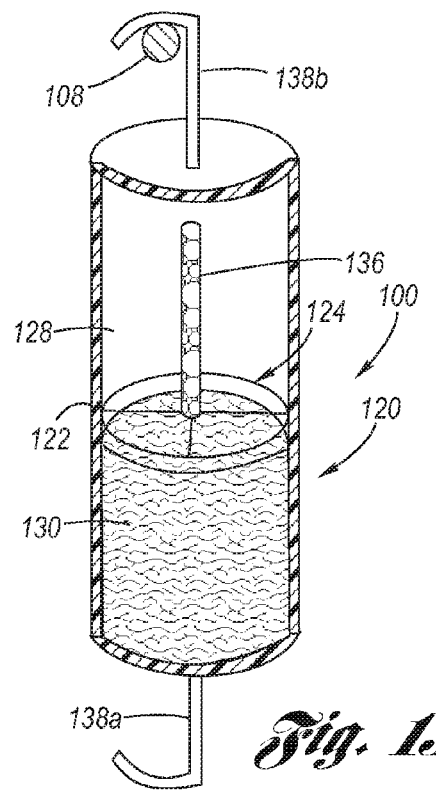
Figure 14:
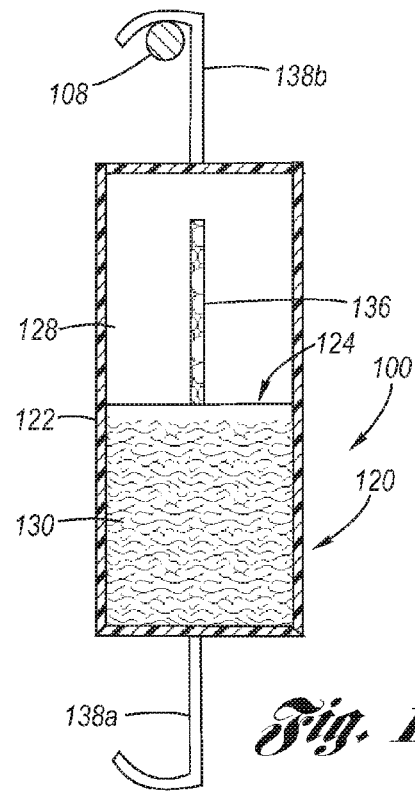
Figure 15:
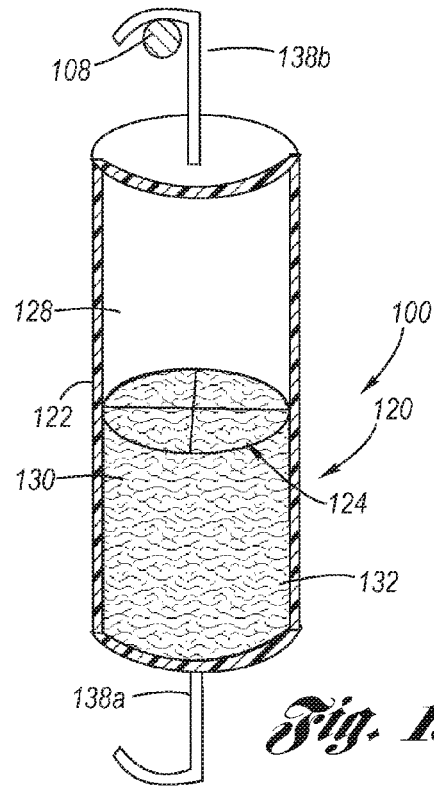
Figure 16:
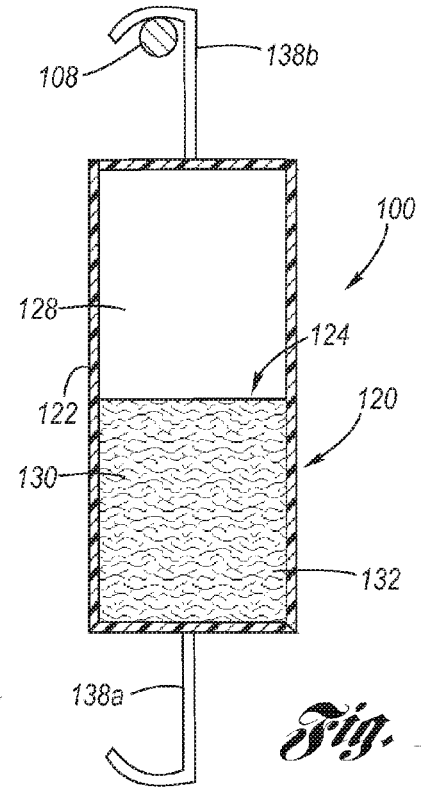

In the event the refrigeration apparatus 104 of the freezer 102 re-operates and re-establishes a freezing temperature, as for example the cold temperature, $T_c$, in the cold zone 106 of the freezer 102, the water 132 in the lower chamber 130 will refreeze into ice (the liquid frozen) 136, as depicted at FIGS. 3 and 4.

The presence of either water 132 or ice 136 in the lower chamber 130 is indicative that a thaw episode has occurred, the severity of which being indicated by the depth of the water or ice. The presence of ice 136 in the lower chamber 130 is indicative that after the thaw episode a refreeze event transpired. This means the objects in the refrigerator have been subjected to a thaw and refreeze cycle. Of course, this may include several thaw/refreeze cycles in the final result observed in the lower chamber 130.

In the prior art, if after a thaw episode the refrigeration apparatus has re-frozen the objects 112 in the cold zone 106, an unsuspecting user would not know of the thaw episode. However in accordance with the present invention, the presence of ice 136 in the lower chamber 130 of the freezer thaw indicator 100 reliably reveals information regarding the thaw and refreeze cycle to the user.

The freezer thaw indicator is usable over and over again. To reset the freezer thaw indicator 100 for another usage, if ice is present in the lower chamber, preferably but not necessarily, it is allowed to thaw, as for example by placement in a room temperature kitchen area. Then the steps above are repeated: an inverted attitude freeze, as per FIGS. 8A through 8D is followed by a righted attitude operability, as per FIGS. 1, 2, 6 and 7.

In FIGS. 1 through 16, the porous support member 124 consists of a cross-hairs 140 attached to a ring 126 (see FIG. 5A). The cross-hairs 140 are mutually orthogonal and may be composed of aluminum wire, fiberglass thread or other filaments or rods 144. By way of example, a filament may be on the order of 0.01 inch diameter. The ring 126, preferably thin, recessed or otherwise configure as discussed hereinabove, provides a periphery of the porous support member 124 for abutting relation to the inside surface 122i of the container walls 122, whereat the ring is attached, as mentioned above. In this regard, filaments are preferably stretched taut across the ring 126, whereas stiff rods may connect with the ring or obviate the ring by direct interface with the container walls 122.

FIGS. 17 through 20 show examples of variations of configuration of the porous support member 124. In FIG. 17, the porous support member 124a is composed of a plurality of filaments 144a arranged in a mutually radial configuration. In FIG. 18, the porous support member 124b is composed of a plurality of filaments 144b arranged in a mutually rectilinear configuration. In FIG. 19, the porous support member 124c is composed of a disc 146 having formed therein a plurality of openings 146a. Note that the central region 146b of the disc 146 has no hole, as the ice melt will likely result in an ice shard (see for example FIGS. 13 and 14) which would undesirably otherwise fall through a central hole if it was to be provided. In FIG. 20, the porous support member 124d is composed of a stiff mesh 148, as for example a stiff polyether foam. Other configurations can be implemented, as for example described in Examples IV through VI.

While the freezer thaw indicator according to the present invention may have an elongated cylinder configuration with first and second hooks as shown generally at FIGS. 1 through 16, the freezer thaw indicator can have other shapes. By way of example, FIGS. 21 through 24 depict a squat cuboid shaped freezer thaw indicator 100a suitable for resting upon a shelf 108 of the freezer 102. An example of the freezer thaw indicator 100a is discussed in detail in Example III.

It is to be understood that any shape and/or size of freezer thaw indicator is contemplated by the present invention.

Figure 25:
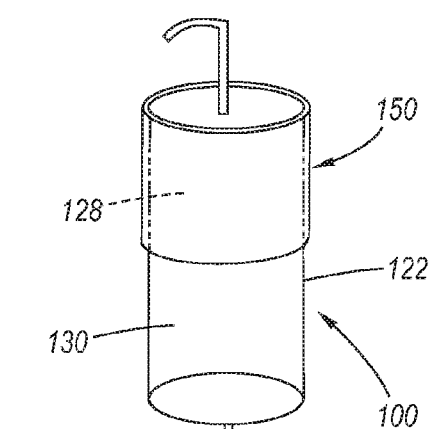
FIG. 25 is a view of a freezer thaw indicator according to the present invention provided with a selective heat transfer rate sleeve.

FIG. 25 depicts a variation of the freezer thaw indicator 100 in which a sheath 150 is slid over the container walls 122. While the sheath 150 may be disposed over the upper chamber 128, as shown, it can also cover the lower chamber 130 if it is cooperatively transparent thereat. The purpose of the sheath 150 is to adjust the thermal sensitivity of the upper chamber 128 during a thaw episode to coincide with a thermal cross-section of the freezer 102 such that the melt rate of the ice 136 coincides with the thaw rate of the objects 112 in the cold zone 106. The sheath may be used for any configuration freezer thaw indicator, as for example including that shown in FIGS. 21 through 24; see also FIG. 29.

In summation, the method according to the present invention includes: providing a freezer thaw indicator having container walls defining a closed inner space, a porous support member disposed in the closed inner space and fixed in positional relation to the container walls such that on one side of the porous support member is an upper chamber of the closed inner space and on the other side of the porous support member is a lower chamber of the closed inner space, wherein a liquid partly fills the closed inner space; orienting the container to a first orientation such that the lower chamber is vertically above the upper chamber with respect to gravity, wherein the liquid is disposed in the upper chamber; freezing the liquid, as for example by cold of the cold zone of the freezer; orienting the container to a second orientation such that the upper chamber is vertically above the lower chamber with respect to gravity, wherein the frozen liquid remains in the upper chamber; placing the container in the cold zone; and indicating occurrence of a thaw episode of the cold zone of the freezer by presence of the liquid in the lower chamber.

Further according to the method of the present invention, indicating occurrence of the thaw episode and occurrence of a refreeze event thereafter by presence of the liquid frozen in the lower chamber.

Still further according to the method of the present invention, reusing the freezer thaw indicator. The reuse including: preferably but not necessarily, melting any frozen liquid in the lower chamber; reorienting the container to the first orientation, wherein the liquid is disposed in the upper chamber; refreezing the liquid, as for example by cold of the cold zone of the freezer; reorienting the container to the second orientation, wherein the frozen liquid remains in the upper chamber; placing the container in the cold zone; and re-indicating occurrence of a thaw episode of the cold zone of the freezer by presence of the liquid in the lower chamber.

FIG. 27 is an algorithm 200 for adjusting the thermal sensitivity of a freezer thaw indicator according to the present invention, wherein the ice melt in the upper chamber thereof during a thaw episode coincides with a thermal cross-section of the freezer.

The algorithm begins at Block 202, whereat container walls are configured.

At Block 204, a porous support member is provided.

At Block 206, the porous support member is fixed in positional relation to the inside surface of the container walls, establishing demarcation between upper and lower chambers of the container walls. For example, the container walls may be constructed of two components, allowing placement of the porous support member, whereupon the two components are then sealingly attached to each other. For a second example, the container walls may be molded over the porous support member. Water is introduced into the container walls. This may be carried out as a shown at FIG. 5 with the opening 134 therefor sealed thereafter. The water introduction step can be separate or performed in conjunction with the two component attachment operation.

At Block 208, a thermal cross-section for a cold zone of a freezer is determined. For example, a freezer is provided (or simulated) which has a predetermined thermal transfer rate and includes an estimate of specific and latent heat capacities of a likely collection of objects in the cold zone together with the thermal heat transfer rate from an external environment into the cold zone based upon selected initial thaw episode starting temperatures of the external environment (considered a constant) and the cold zone (continually rising until the temperature of the external environment is reached). For example, the objects may equivocate to the specific and latent heat capacities of 6 gallons of frozen water and the heat transfer is from room temperature (72 degrees Fahrenheit) of the external environment to progressively increasing cold zone temperature starting at 3 degrees Fahrenheit. A freezer thermal cross-section time for heat from the external environment to raise the temperature in the cold zone to above 32 degrees Fahrenheit (whereupon thawing occurs at sea level) is determined empirically or by standard and well known equations of physics for heat transfer processes. A freezer thermal heat cross-section time may, for example, be 36 hours. A food safety factor may be included which reduces the freezer thermal heat cross-section time.

At Block 210, the freezer thaw indicator is tested in the cold zone of a freezer with the determined thermal cross-section by inducing a thaw episode. In this regard, the test empirically examines whether ice melt in the freezer thaw indicator matches with thaw of the objects in the cold zone.

At Decision Block 212, inquiry is made whether the freezer thaw indicator properly indicated the severity of the thaw episode. For example, if the lower chamber is filled with water at about the same time the objects thawed, then agreement is made. If, however, there is yet ice in the upper chamber and the objects are thawed, then the freezer thaw indicator is not sensitive enough. If, however, the lower chamber is filled with water and the objects are still generally frozen, then the freezer thaw indicator is too sensitive.

If the answer to the inquiry at Decision Block 212 is yes, then the algorithm proceeds to Block 214 and ends with a completed freezer thaw indicator for a range of freezers generally having the freezer thermal cross-section.

If the answer to the inquiry at Decision Block 212 is no, then the algorithm proceeds to Blocks 216 through 220, and then to Block 210. In this regard, the process can proceed as in Blocks 202 through 206, and/or a sheath, as for example shown in FIG. 25, may be installed or adjusted for thermal transfer therethrough. More particularly by way of example, if there was yet ice in the upper chamber as a result of the inquiry of Decision Block 212, then the freezer thaw indicator needs to be provided with a higher heat conductivity through the upper chamber. On the other hand more particularly by way of example, if the lower chamber was prematurely filled with water as a result of the inquiry of Decision Block 212, then the freezer thaw indicator needs to be provided with a lower heat conductivity through the upper chamber. These heat transfer adjustments may be made, for example, by adjusting the thickness and/or material of the container walls and/or of the sheath.

It is to be noted the above steps may be carried out empirically or by electronic computer simulation.

Advantageously, a graduated scale 400 may be placed visibly onto the container wall 122 at the lower chamber 130. The graduation of the graduated scale may indicate, for example, depth of melt water during a thaw event, percent of thaw of the ice in the upper chamber, and/or the graduation may be calibrated with respect to the freezer thermal cross-section so as to indicate duration of the thaw, as for example in hours (or selected multiples thereof), as for example shown at FIGS. 2 and 4.

It is to be noted that some regions of the cold zone of the freezer may be more susceptible to thaw than others. For example, objects in shelves of the door will be more susceptible to thaw than objects in the center of the freezer cold zone. In this regard, a user could utilize two or more freezer thaw indicators, preferably with differing thermal sensitivities. For example, one placed on a door shelf and another centrally disposed in the cold zone.

Further, the sheath may have user application. For example, the freezer thaw indicator can be supplied with a preset sensitivity to thaw, suitable for central placement in a cold zone sparsely populated by objects, or for a freezer door shelf. In which case, if the freezer is densely populated with objects, the user would slip the sheath over the upper chamber to reduce thermal sensitivity of the freezer thaw indicator when placed centrally in the cold zone.

Example I

A freezer thaw indicator 100b according to the present invention was fashioned as schematically shown at FIG. 26. The container 300 was composed of two commercially available translucent cylindrical plastic components 302 and 304, each about 4 inches long and about one inch in diameter, which provided thin container walls 316 and upper and lower chambers 312, 314. An air hole at the end of each component was sealed by hot melt glue. The porous support member 306 was fashioned from a piece of common aluminum window screen 308 composed of a plurality of aluminum wire filaments 114' in a rectilinear pattern glued to the upper component adjacent the opening thereof. Water, not shown, was added so as to fill the upper component, and the components were thereupon pressed together at a stair-step interconnection 310.

The test freezer was the freezer unit of a Whirlpool "side-by-side" refrigerator. The cold temperature of the cold zone thereof was about 3 degrees Fahrenheit. The assembled freezer thaw indicator was inverted, the upper chamber 312 being vertically below the upper chamber 314 with respect to gravity, and placed into the cold zone and the water was allowed to freeze overnight.

The freezer thaw indicator was then removed from the cold zone of the freezer. The freezer thaw indicator was turned right side up, wherein the upper chamber 312 having ice thereinside (the ice not being shown in FIG. 26), was vertically above the lower chamber 314 and the ice supported on the window screen. The freezer thaw indicator was then placed into a room temperature location of a kitchen in the right side up orientation.

Simultaneously, several frozen dinners were placed side-by-side with each other in proximal spatial relation to the freezer thaw indicator in order to provide a simulated objects thaw in a freezer with a determined thermal cross-section undergoing a thaw episode.

In approximately 3 hours the ice in the upper chamber melted and collected as water in mostly the bottom chamber. The frozen dinners were on the verge of thaw, but could be considered still frozen enough for safe refreezing, although this is subjective.

It was noted that because of surface tension at the window screen, melt water tended to accumulate in the upper chamber until the weight of the water exceed the force of the surface tension.

It was concluded the performance of the freezer thaw indicator was dissatisfactory for its intended purpose due to melt water retention in the upper chamber caused by the surface tension of the window screen.

Example II

A freezer thaw indicator according to the present invention was fashioned as schematically shown at FIG. 26, but now with the cross-hairs porous support member of FIG. 5A. The container 300 was composed of the previously described translucent, thin walled, cylindrical plastic components 302 and 304 forming the upper and lower chambers 312, 314 of Example I. The porous support member was fashioned from a cross-hair of two aluminum wire window screen filaments, see 144 in FIG. 5A, oriented orthogonal to each other, and secured by an overage portion of the filaments held to the outside of the wall by adhesive tape. Water was added as described above, and the components ere pressed together at the stair-step interconnection.

The test freezer was the Whirlpool "side-by-side" refrigerator of Example I. The assembled freezer thaw indicator was inverted, as per Example I, and placed into the cold zone and allowed to freeze overnight.

The freezer thaw indicator was then removed from the cold zone of the freezer, turned right side up (as per Example I), and placed into a room temperature location of a kitchen, wherein the ice was supported on the cross-hairs.

In approximately just over 2.5 hours the ice in the upper chamber melted and collected as water in the bottom chamber. The observed melt process went forward substantially as depicted in FIGS. 9 through 16.

It was noted that the ice remained supported on the cross-hairs due to a small amount of melt grooving, which essentially secured the ice to the cross-hairs as the ice melted. There was a total absence of melt water retention in the upper chamber due to surface tension.

It was concluded the performance of the freezer thaw indicator was satisfactory for its intended purpose of indicating a thaw episode.

Example III

A freezer thaw indicator 100a according to the present invention was fashioned as schematically shown at FIGS. 21 through 24, having a squat cuboid shape and a cross-hairs porous support member.

The container 350 was composed of two commercially available translucent cuboid plastic components 352 and 354 having thin walls 356. Each component was about 0.75 inch deep, about 4 inches long and about 2.75 inches wide, providing upper and lower chambers 358, 360 (see FIG. 22).

Figure 23:
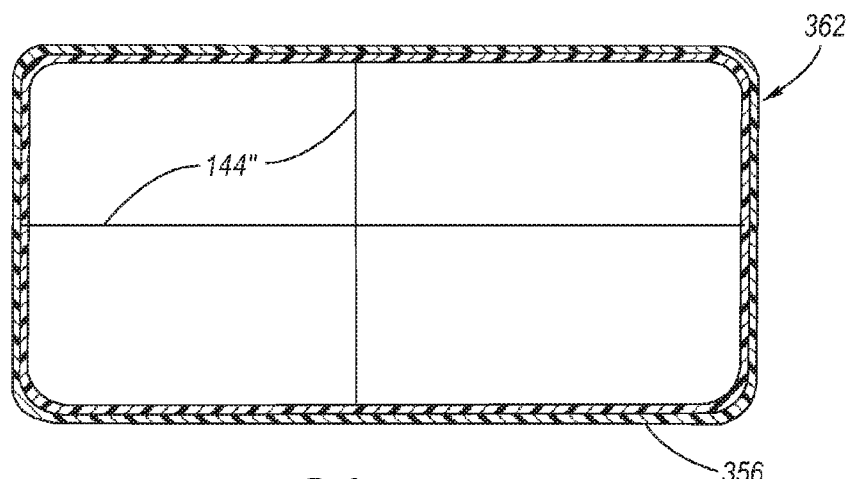
FIG. 23 is a sectional view, seen along line 23-23 of FIG. 22.
Figure 24:
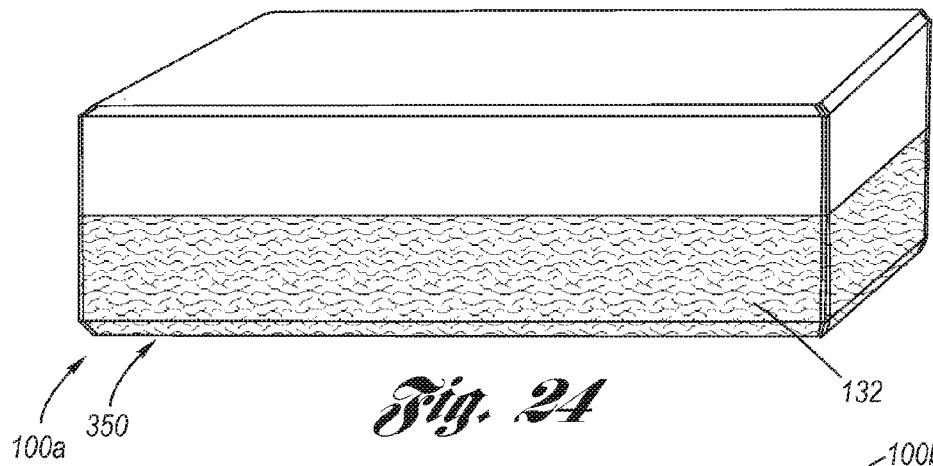
FIG. 24 is a view as in FIG. 21, wherein now the freezer thaw indicator indicates a thaw episode has occurred in the cold zone of a freezer.

The porous support member 362 was fashioned from a cross-hair of two aluminum window screen filaments 144" oriented orthogonal to each other, as shown at FIG. 23. In this regard, the filaments were secured by an overage portion thereof being held to the outside of the wall by adhesive tape. Water was added so as to fill the upper component 358, and the components then pressed together at a stair-step interconnection 364.

The test freezer was the Whirlpool "side-by-side" refrigerator as described in Example I. The assembled freezer thaw indicator was inverted (as described in Example I) and then placed into the cold zone and allowed to freeze overnight.

The freezer thaw indicator was then removed from the cold zone of the freezer and then turned right side up (as described in Example I). No discernable ice or water was present on the floor 152'. The freezer thaw indicator was thereupon placed into a room temperature location of a kitchen, wherein the ice was supported on the cross-hairs.

In approximately 3 hours the ice in the upper chamber melted and collected as water in the bottom chamber. The observed melt process went forward analogous to that depicted in FIGS. 9 through 16, wherein now the ice was configured as a block, rather than as a cylinder.

It was noted that the ice remained supported on the cross-hairs due to a small amount of melt grooving, which essentially secured the ice to the cross-hairs as the ice melted. There was a total absence of melt water retention in the upper chamber due to surface tension.

It was concluded the performance of the freezer thaw indicator was satisfactory for its intended purpose of indicating a thaw episode.

Example IV

A freezer thaw indicator 100c according to the present invention was fashioned as schematically shown at FIG. 28. The container 300' was composed of a commercially available clear, thin walled, cylindrical plastic cylinder with an open mouth top with an outwardly facing rim bulb. A resilient cap 320 press-fit onto the mouth to provide a sealed inner space of the container. The cap and the plastic cylinder constituted the container walls 316'. The container 300' had a height of about 1.5 inches and a diameter of about 1.12 inches. A commercial car finish wax was applied to the inside surfaces of the container and the cap in an effort to provide a hydrophobic property.

The porous support member 306' was fashioned from a cross-hair of two aluminum wire window screen filaments 114" oriented orthogonal to each other, and secured by a vertical leg 114e anchored at the seal of the cap with the mouth.

A commercial food coloring (red 3) was added to water and stirred to provide water with a visual marker. The water with visual marker was added with the cap removed, wherein the lower chamber 314' was filled and wherein the upper chamber 312' was about the same volume. The cap was then snapped onto the mouth.

The test freezer was the Whirlpool "side-by-side" refrigerator of Example I. The freezer thaw indicator was inverted, as per Example I, and placed into the cold zone and allowed to freeze for several hours.

The freezer thaw indicator was then removed from the cold zone of the freezer, turned right side up, and placed into a room temperature location of a kitchen, wherein the ice 136 was supported on the cross-hairs.

In approximately 1.5 hours the ice in the upper chamber melted and collected as water in the bottom chamber. The observed melt process went forward substantially as depicted in FIGS. 9 through 16.

It was noted that the ice remained supported on the cross-hairs due to a small amount of melt grooving, which essentially secured the ice to the cross-hairs as the ice melted. There was a total absence of melt water retention in the upper chamber due to surface tension. However, the wax did not provide the desired level of hydrophobic property, as some wetting occurred in the 90 degree corner of the periphery of the floor 152". In this regard, it was surmised the rounded corners of the container walls of Example III reduced observance of surface wetting, and conjectured that the plastic may have been natively hydrophobic.

It was concluded the performance of the freezer thaw indicator was moderately satisfactory for its intended purpose of indicating a thaw episode.

Example V

A freezer thaw indicator 100c according to the present invention was fashioned as schematically shown at FIG. 29 (containers 300' and porous support members 306' are identical in both FIGS. 28 and 29). The container 300' was composed of a commercially available clear, thin walled, cylindrical plastic cylinder with an open mouth top with an outwardly facing rim bulb. A resilient cap 320 press-fit onto the mouth to provide a sealed inner space of the container. The cap and the plastic cylinder constituted the container walls 316'. The container 300' had a height of about 1.5 inches and a diameter of about 1.12 inches. A commercial car finish wax was applied to the inside surfaces of the container and the cap in an effort to provide a hydrophobic property.

The porous support member 306' was fashioned from a cross-hair of two aluminum wire window screen filaments 114" oriented orthogonal to each other, and secured by a vertical leg 114e anchored at the seal of the cap with the mouth.

A commercial food coloring (red 3) was added to water and stirred to provide water with a visual marker. The water with visual marker was added with the cap removed, wherein the lower chamber 314' was filled and wherein the upper chamber 312' was about the same volume. The cap was then snapped onto the mouth.

A commercial 0.375 inch thick foam weather strip with an adhesive backing was applied to the container walls at the upper chamber 312' to provide a sheath 150'.

The test freezer was the Whirlpool "side-by-side" refrigerator of Example I. The freezer thaw indicator was inverted, as per Example I, and placed into the cold zone and allowed to freeze overnight. After application of the sheath 150', the freezer thaw indicator was placed into the cold zone for another two hours to achieve thermal equilibrium to the temperature of the cold zone.

The freezer thaw indicator was then removed from the cold zone of the freezer, turned right side up, and placed into a room temperature location of a kitchen, wherein the ice 136 was supported on the cross-hairs.

In approximately just under 2.5 hours the ice in the upper chamber melted and collected as water in the bottom chamber. The observed melt process went forward substantially as depicted in FIGS. 9 through 16.

It was noted that the ice remained supported on the cross-hairs due to a small amount of melt grooving, which essentially secured the ice to the cross-hairs as the ice melted. There was a total absence of melt water retention in the upper chamber due to surface tension.

It was concluded the performance of the freezer thaw indicator was moderately satisfactory for its intended purpose of indicating a thaw episode due to the aforementioned peripheral wetting at the floor 152".

Example VI

A freezer thaw indicator 100c according to the present invention was fashioned as schematically shown at FIG. 28. The container 300' was composed of a commercially available clear, thin walled, cylindrical plastic cylinder with an open mouth top with an outwardly facing rim bulb. A resilient cap 320 press-fit onto the mouth to provide a sealed inner space of the container. The cap and the plastic cylinder constituted the container walls 316'. The container 300' had a height of about 1.5 inches and a diameter of about 1.12 inches. A hydrophobic silicone polymer, commercially known as "Rain-X", a registered trademark product distributed by Sopus Products of Houston, Tex., was applied to the inside surfaces of the container and the cap to provide a hydrophobic property.

The porous support member 306' was fashioned from a cross-hair of two aluminum wire window screen filaments 114" oriented orthogonal to each other, and secured by a vertical leg 114e anchored at the seal of the cap with the mouth.

Rolling ball pen liquid ink (red) was added to water and stirred to provide water with a visual marker. The water with visual marker was added with the cap removed, wherein the lower chamber 314' was filled and wherein the upper chamber 312' was about the same volume. The cap was then snapped onto the mouth.

The test freezer was the Whirlpool "side-by-side" refrigerator of Example I. The freezer thaw indicator was inverted, as per Example I, and placed into the cold zone and allowed to freeze for several hours.

The freezer thaw indicator was then removed from the cold zone of the freezer, turned right side up, and placed into a room temperature location of a kitchen, wherein the ice 136 was supported on the cross-hairs.

In approximately 1.75 hours the ice in the upper chamber melted and collected as water in the bottom chamber. The observed melt process went forward substantially as depicted in FIGS. 9 through 16.

It was noted that the ice remained supported on the cross-hairs due to a small amount of melt grooving, which essentially secured the ice to the cross-hairs as the ice melted. There was a total absence of melt water retention in the upper chamber due to surface tension. Additionally, the hydrophobic silicone polymer provided the desired level of hydrophobic property, as there was no wetting in the 90 degree corner of the periphery of the floor 152".

It was concluded the performance of the freezer thaw indicator was satisfactory for its intended purpose of indicating a thaw episode.

To those skilled in the art to which this invention appertains, the above described preferred embodiment may be subject to change or modification. For example, the freezer thaw indicator according to the present invention could serve as a thaw/refreeze indicator in other applications, such as a frozen carbon dioxide cooled ice chest. Such change or modification can be carried out without departing from the scope of the invention, which is intended to be limited only by the scope of the appended claims.

The invention claimed is:

1. A method for adjusting thermal sensitivity of a freezer thaw indicator to match a thermal cross-section of a freezer, said method comprising the steps of:

providing container walls defining a closed inner space;

providing a porous support member disposed in the closed inner space and fixed in positional relation to the container walls such that on one side of the porous support member is an upper chamber of the closed inner space and on the other side of the porous support member is a lower chamber of the closed inner space;

providing the freezer thaw indicator by introduction of a liquid into the closed inner space, wherein the liquid partly fills the inner space;

providing a cold zone of a freezer having the thermal cross-section, the thermal cross-section including at least one frozen object;

orienting the container to a first orientation such that the lower chamber is vertically above the upper chamber with respect to gravity, wherein the liquid is disposed in the upper chamber;

freezing the liquid in the first orientation;

orienting the container to a second orientation such that the upper chamber is vertically above the lower chamber with respect to gravity, wherein the frozen liquid remains in the upper chamber;

inducing a thaw episode of the cold zone;

indicating occurrence of the thaw episode of the cold zone of the freezer by presence of the liquid in the lower chamber; and determining whether the indication of occurrence matches thaw of the at least one frozen object;

wherein if said step of determining determines a match, then the freezer thaw indicator has a correct sensitivity; and wherein if said step of determining determines a mismatch, then the freezer thaw indicator has an incorrect sensitivity and said step of providing container walls is repeated until said step of determining determines a match.

2. The method of claim 1, wherein said steps are carried out electronically by a computer based simulation.

3. The method of claim 1, wherein the repeating of said step of providing container walls further comprises adjusting a sheath, wherein the sheath at least partly covers the container walls adjoining the upper chamber.

\* \* \* \* \*